G. GROS.
MACHINE FOR MAKING COAT OF MAIL FABRIC.
APPLICATION FILED NOV. 7, 1912.

1,087,941.

Patented Feb. 24, 1914.
7 SHEETS—SHEET 1.

WITNESSES.
Albert G. Pieczentkowski
Robert E. Lanphear

INVENTOR.
George Gros
By Horatio E. Bellows
ATTORNEY.

G. GROS.
MACHINE FOR MAKING COAT OF MAIL FABRIC.
APPLICATION FILED NOV. 7, 1912.

1,087,941.

Patented Feb. 24, 1914.
7 SHEETS—SHEET 2.

WITNESSES.
Albert G. Piesentkowski
Robert E. Lamphear

INVENTOR.
George Gros
By Horatio E. Bellows
ATTORNEY.

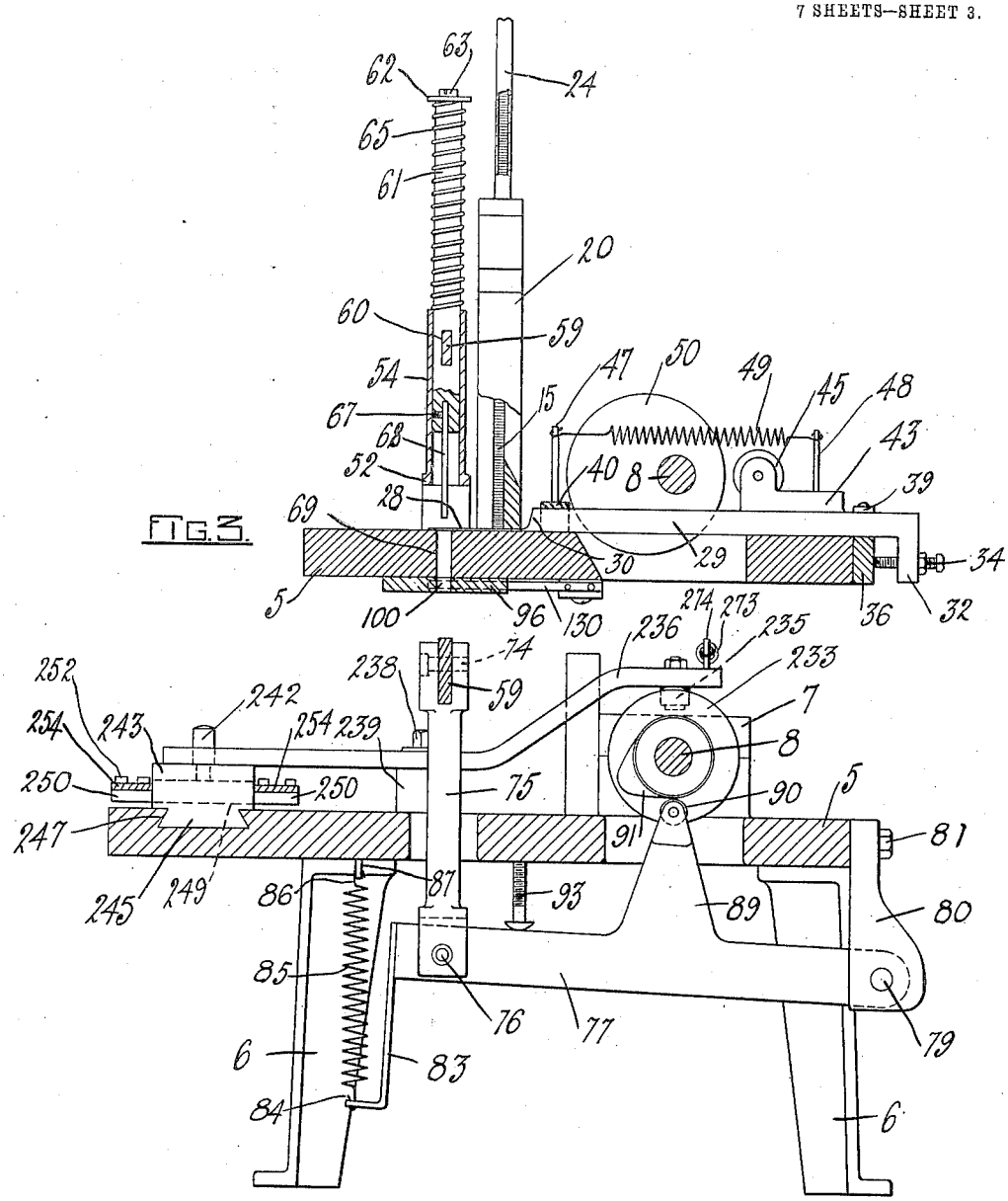

G. GROS.
MACHINE FOR MAKING COAT OF MAIL FABRIC.
APPLICATION FILED NOV. 7, 1912.

1,087,941.

Patented Feb. 24, 1914.

WITNESSES.
Albert G. Pregenthoveki
Robert E. Lamphear

INVENTOR.
George Gros
By Horatio E. Bellows
ATTORNEY.

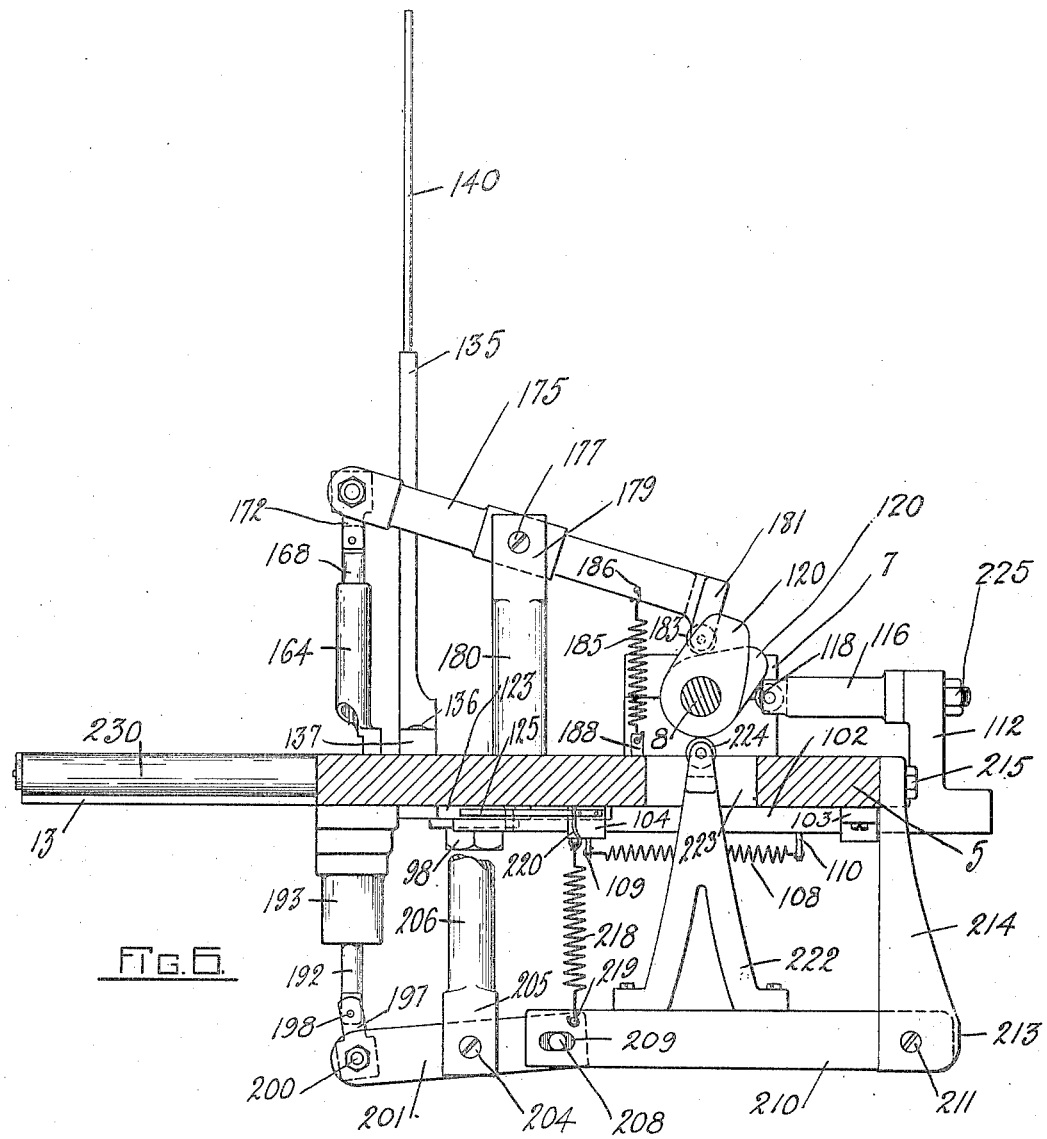

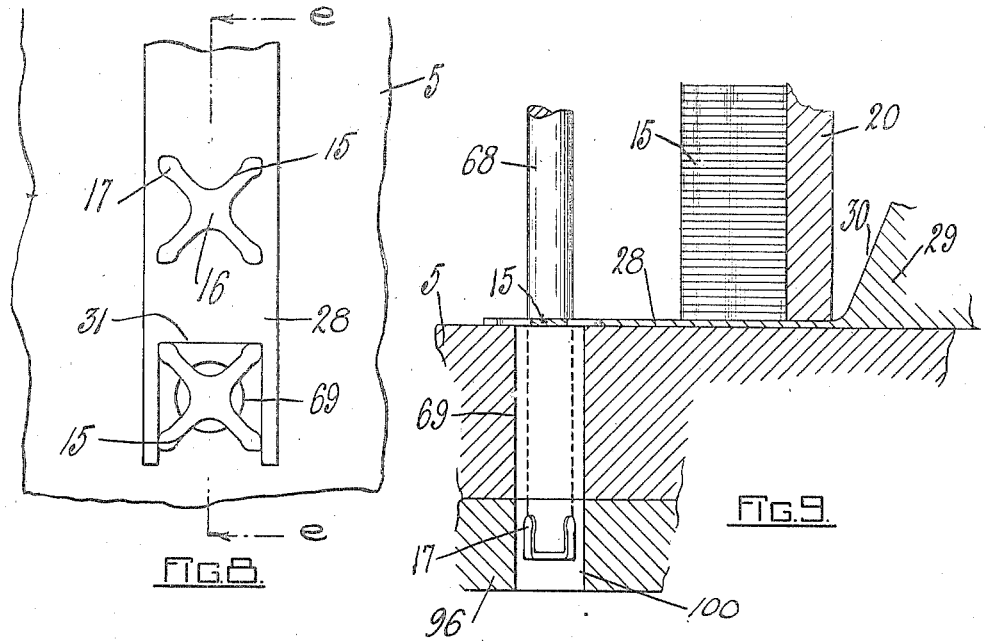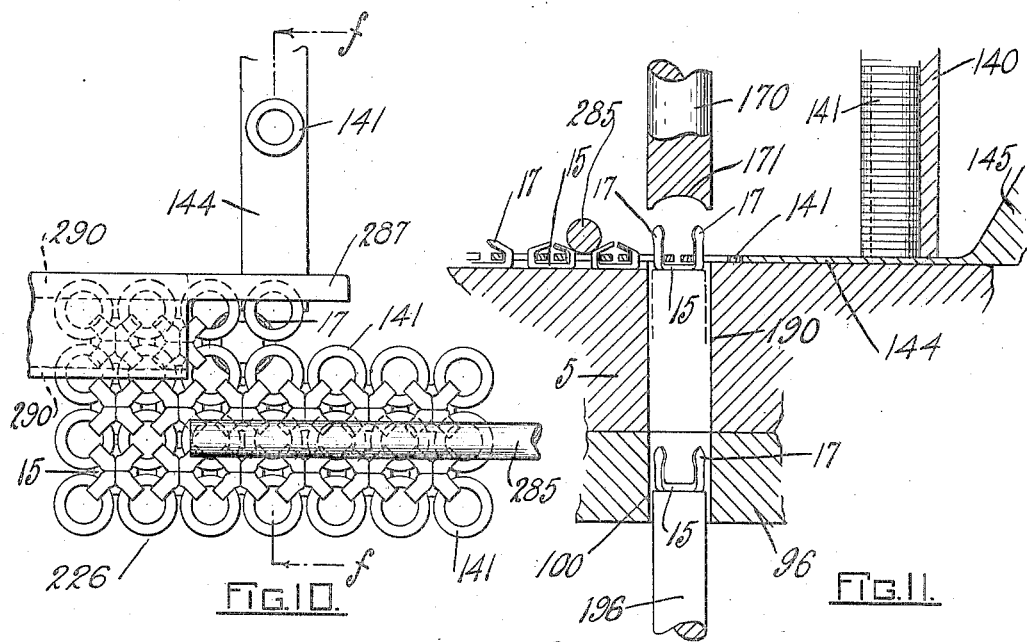

UNITED STATES PATENT OFFICE.

GEORGE GROS, OF NORTH ATTLEBORO, MASSACHUSETTS, ASSIGNOR TO SAGHATIEL G. MANDALIAN AND EUGENE A. HAWKINS, OF NORTH ATTLEBORO, MASSACHUSETTS.

MACHINE FOR MAKING COAT-OF-MAIL FABRIC.

1,087,941.     Specification of Letters Patent.     Patented Feb. 24, 1914.

Application filed November 7, 1912. Serial No. 729,962.

*To all whom it may concern:*

Be it known that I, GEORGE GROS, a citizen of the United States, residing at North Attleboro, in the county of Bristol and State of Massachusetts, have invented certain new and useful Improvements in Machines for Making Coat-of-Mail Fabric, of which the following is a specification.

My invention relates to a machine for automatically making a coat of mail or fish scale fabric of common use in the arts which has heretofore generally been constructed by hand. This fabric consists of a series of substantially rectangular plates arranged in parallel and transverse rows, and engaging horizontal and transverse rows of rings. Each plate is provided with four inwardly converging folded arms, each arm passing through an adjacent ring, so that each ring has four arms engaged therewith. My machine automatically bends the planchets or original blanks so that the arms thereof are folded into engagement with the rings which are also automatically supplied to the planchets at the proper time.

The essential objects of my invention are to automatically form the described fabric; to effect this end in an inexpensive manner; and to insure a speedy and accurate operation of the mechanism.

The invention accordingly consists in the features of construction, combinations of elements, and arrangement of parts which will be exemplified in the construction hereinafter set forth; and the scope of the application of which will be indicated in the appended claims.

Figure 1:
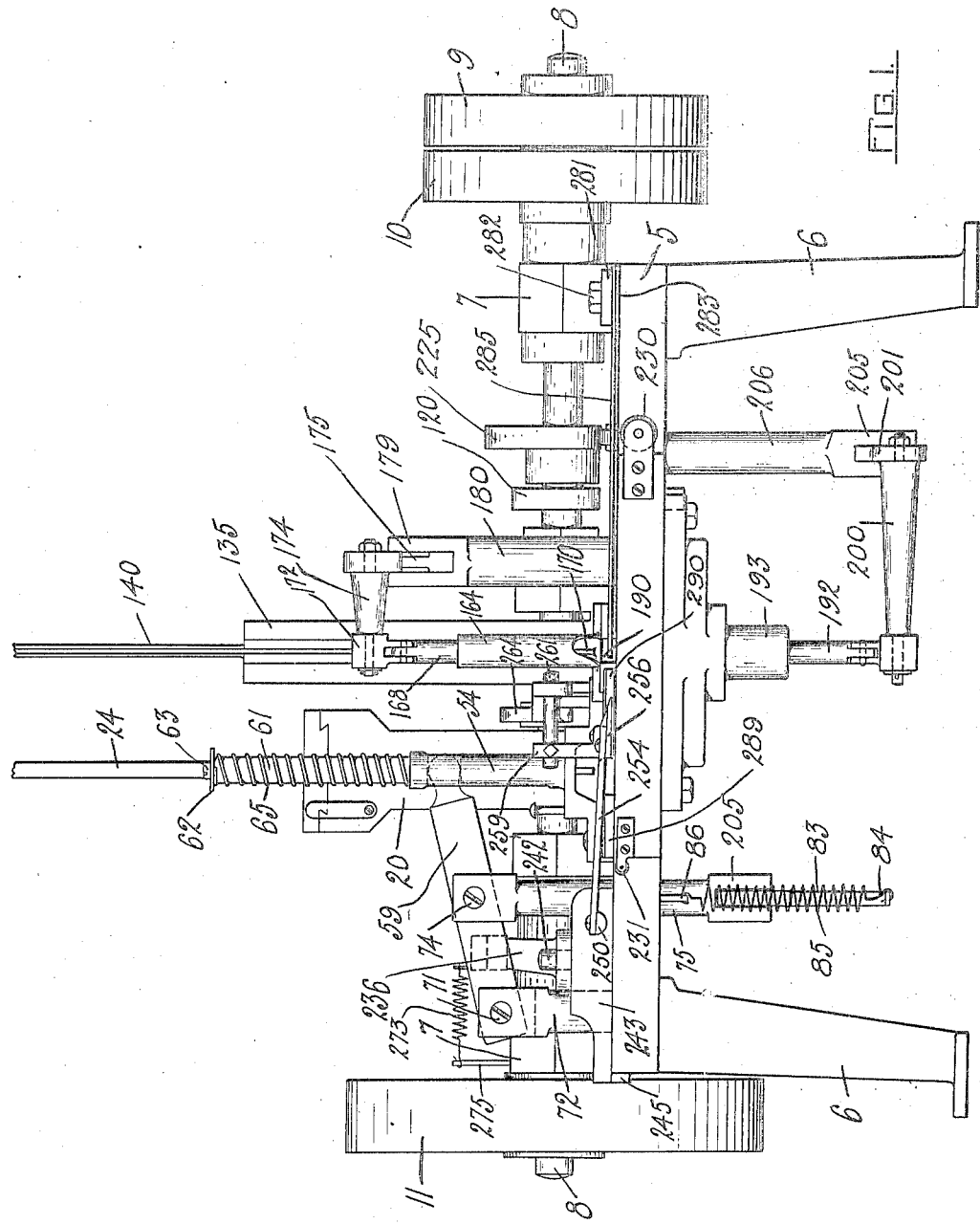
Figure 2:
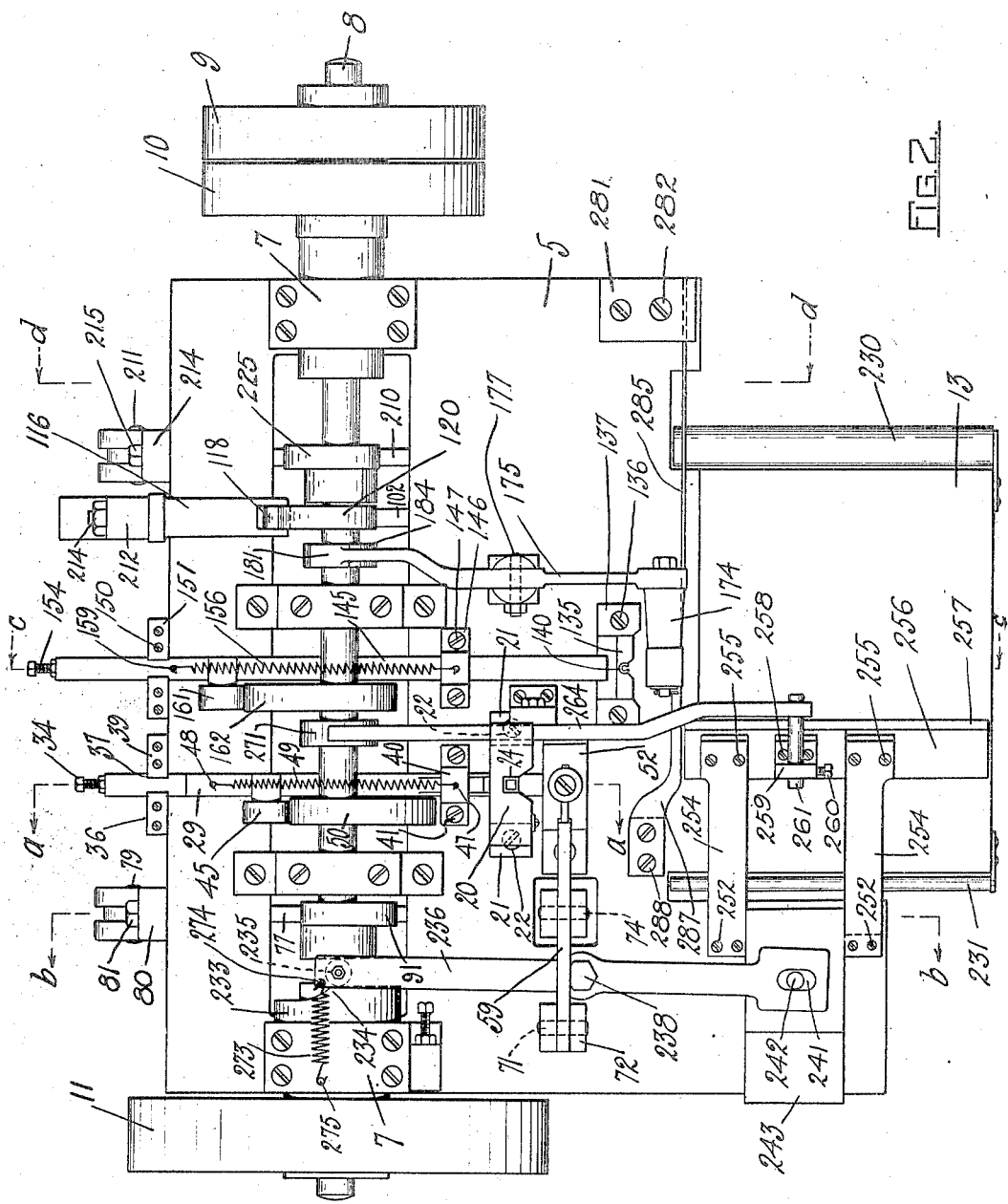
Figure 12:
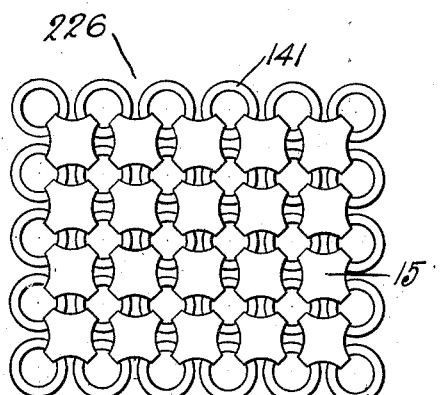
Figures 13, 14:
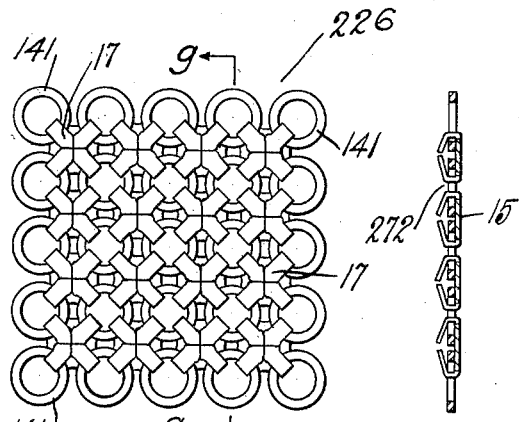
Figure 7:
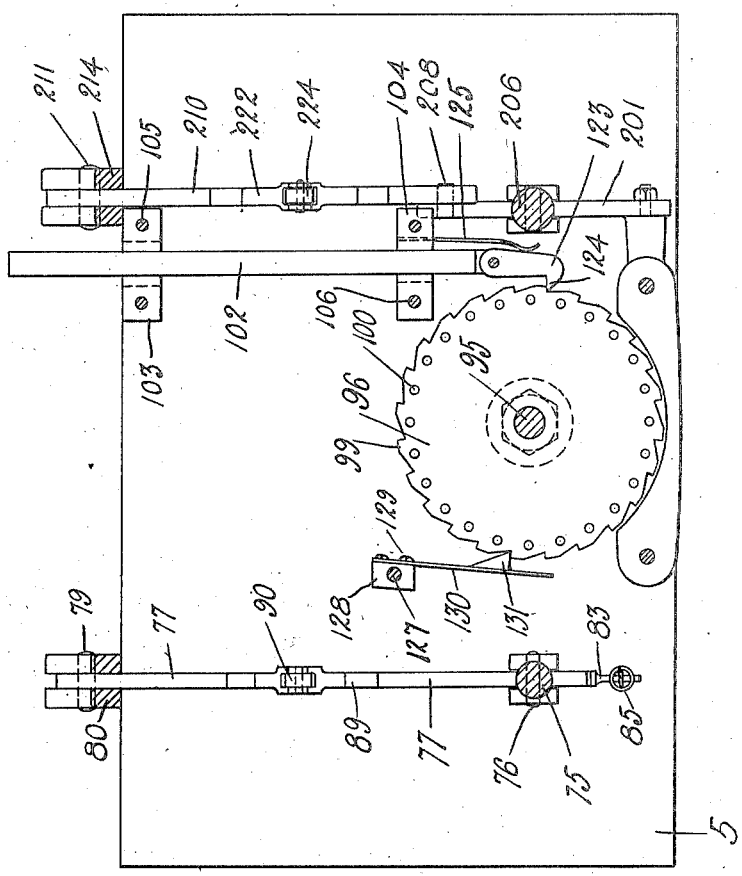

In the accompanying drawings which form a part of this specification:—Figure 1 is a front elevation of the machine, Fig. 2, a plan of the same, Figs. 3, 4, 5 and 6, sections on lines $a\ a$, $b\ b$, $c\ c$ and $d\ d$ respectively of Fig. 2, Fig. 7, a bottom plan view of the carrier and adjacent mechanism below the table, Fig. 8, a plan view of a portion of the table beneath the first bending tool, Fig. 9, a section of the table and adjacent parts on line $e\ e$ of Fig. 8, showing the blank in side elevation, Fig. 10, a plan view of another portion of the table adjacent the second bending tool, Fig. 11, a section on line $f\ f$ of Fig. 10, showing the blank in side elevation, Figs. 12 and 13, obverse and reverse surfaces of the fabric formed by the machine, Fig. 14, a section on line $g\ g$ of Fig. 13, and Fig. 15, a section of the parts shown in Fig. 9 taken at a vertical angle of 45° from that of the section in said figure.

Like reference characters indicate like parts throughout the views.

The framework of my machine may be of any form best adapted to carry the operated parts. In the present instance the framework comprises a bed 5 carried by supports 6 and on which are bearings 7 and a driving shaft 8 carrying the fast and loose pulleys 9 and 10 at one end and a balance wheel 11 upon the other end. The bed or table 5 is provided at its front with a forward extension 13 integral with or suitably attached to the main portion 5 and of substantially rectangular outline. Upon the table 5 and extension 13 are mounted the mechanisms for feeding to the fabric that is being formed the constituent stars and rings, and the mechanism for feeding the fabric itself during the clamping of the planchets and rings thereto.

Referring now to the plates or planchets 15, as shown in Fig. 8, these elements consist of a central body portion 16 and four radial arms 17 disposed at right angles to each other. These plates are of bendable material and are fed to the fabric by the following mechanism: A post 20 has lateral extensions 21 at its base through which pass attaching screws 22 which enter the table 5 to retain the post in position. Fixed in the post 20 and extending lengthwise thereof is a rectangular tube 24 whose lower end is in the same horizontal plane as the bottom of the post. In this tube 24 are packed one above the other a plurality of the planchets 15. On the table 5 below the post 20 is the forward flat end portion 28 of a slidable rod 29 provided with a vertical shoulder 30 upon its forward end. The portion 28 has a rectangular recess 31. The rod 29 has fixed to or integral with its rear end a downwardly directed arm portion 32 carrying a horizontal adjusting screw 34 whose inner end abuts against a plate 36 fixed to the rear of the bed 5. The plate 36 is cut away as at 37 to allow passage therethrough of the rod 29 and forms a guide therefor in conjunction with overlapping plates 39 fixed to the plate 36. Coöperating with the guide plate 36 is a second guide plate 40 near the post 20 which is fixed by screws 41 to the table.

Near the rear end of the rod 29 is a vertical shoulder or block 43 in which is mounted an antifriction roller 45. In the guide plate 40 and the block 43 are fixed respectively the pins 47 and 48 to which are attached the ends of a retractile spring 49 whereby the slide 29 is normally advanced below and beyond the end of the tube 24, the limit of the forward advance being determined by the adjusted length of the screw 34. The slide 29 is rearwardly moved in its reciprocation by a cam 50 upon the shaft 8 which contacts in its rotation with the roller 45, thus forcing the member 29 rearwardly. The base 52 of a tubular post 54 is fixed by screws 56 or otherwise to the table 5 at a point immediately in front of the post 20. The tubular post 54 is provided with a longitudinal slot to admit the rounded end of a lever arm 59 which registers in a vertical slot 60 of the rod 61 slidably mounted in the tube 54. A washer 62 is fixed by a screw 63 to the top of the rod 61 and forms a head for the rod against which abuts the upper end of a helical spring 65 whose lower end abuts against the upper end of a tube 54. Fixed by a screw 67 or otherwise in the bottom of the rod or plunger 61 is a second rod 68 of reduced diameter adapted, when the rod 61 is reciprocated, to pass through a circular opening 69 of the table 5, as shown in Fig. 9. The forward movement of the slide 29 engages the lowest of the planchets in the tube 20 and advances the same to a position immediately over the opening 69 whereupon the rod or reduced portion 68 of the plunger 61 descends and forces a planchet downwardly through the table for a purpose to be later described.

The mechanism for reciprocating the plunger 61 is the following: The lever 59 is pivoted at its outer end by a pin 71 to a post 72 fixed on top of the table 5. Pivoted by a pin 74 to an intermediate part of the lever arm 59 is the upper end of a vertical rod 75 whose lower end is pivotally connected by a pin 76 to one end of a lever arm 77 whose rear end is pivoted by a pin 79 to a bracket 80 fixed by screws 81 to the rear edge of the table. Fixed to the forward end of the lever 77 is a downwardly extending bent arm or plate 83 to the lower end of which is fixed the end 84 of a retractile spring 85 whose upper end 86 is attached to a hook or pin 87 in the bottom of the table. This spring normally forces the levers 77 and 59 upwardly to elevate the rod 61. Integral with or fixed to an intermediate portion of the lever 77 is a vertical projection 89 in whose upper end is a roller 90 contacting with a cam 91 upon the shaft 8. This cam roller is pressed against its cam by the pressure of the spring 85. A screw 93 in the bottom of the table, in vertical alinement with the lever 77, forms a stop to the upper movement of the latter.

Pivotally mounted upon the bottom of the table upon a pin 95 is a disk 96 supported in position by the head 98 of the pin, and provided with peripheral teeth 99, adjacent each tooth of which is a marginal opening 100. Each opening 100 is adapted, when the disk is rotated, to register with the opening 69 in the table immediately beneath the plunger 61, so that the planchet 15, when it is being forced downwardly, passes through the table and into one of the openings 100 in the disk wherein it is held by the pressure of the arms 17 of the planchet which have been thus bent up by the action of the plunger rod 68 forcing the planchet through the circular opening 69, as shown in Fig. 9. The disk 96 is intermittently advanced or rotated by a slide or rod 102 mounted in guide plates 103 and 104 fixed to the bottom of the table by screws 105 and 106 respectively. The rod 102 is forwardly pulled by a retractile spring 108 attached at one end to a pin 109 fixed in the guide 104 and at the other end to a pin 110 upon the rod itself. The rear of the rod has an upwardly extending arm 112 in which is fixed by a nut and bolt construction 114 an inwardly directed arm 116 in the forward end of which is mounted a roller 118 adapted to contact with a cam 120. In the end of the sliding rod 102 is a latch 123, whose beak 124 engages the teeth 99 of the disk 96, and is pressed in engagement therewith by a latch spring 125 fixed to the guide 104. Fixed to the lower face of the table by a screw 127 is a block 128 to which is attached by screws 129 the end of a spring rod to engage the teeth 99 of the disk. The reciprocation of the rod 102 by virtue of the cam 120 acts through the latch 123 to rotate the disk 96 step by step. The planchet located in the opening 100 of the disk is by the step by step movement of the latter carried to a new position to be acted upon by a second operation. This operation consists in clamping the planchet 15 into engagement with two rings. The part of the mechanism applying to this operation is the following: A post 135 is attached by screws 136 passing through extensions 137 at its base to the upper portion of the table at one side and somewhat forward of the post 20. The post 135 has passing longitudinally thereof a cylindrical tube 140 containing a plurality of flat rings 141 stacked one upon the other therein. The lower portion of the post is transversely cut away as at 143 to permit the movement therethrough, and below the end of the tube 140, of the forward extremity 144 of the slidable bar 145 moving in the guide 146 attached by screws 147 to the table, and also traversing a guide block 149 fixed to the rear of the table and having attached to its upper face by screws 150 overlapping plates 151. The outer end of the bar 145 is downwardly bent or extended to form an arm 153. In this arm is an adjusting screw 154 adapted to contact with the guide block 149. The rod 145 is forwardly pulled by a retractile spring 156 having one end fixed to a pin 157 in the guide 146, and the other end fixed to a pin 159 in the rod 145. In an elevation 160 of the bar 145 is mounted an antifriction roller 161 which contacts with the periphery of a cam 162 mounted upon the driving shaft 8; which cam moves the reciprocating slide 145 in a rearward direction. Immediately in front of the post 135 is a tubular post 164 fixed to the upper face of the table by screws or in any convenient manner. The tube is transversely cut away at its bottom portion as at 166 to permit passage therethrough of the portion 144 of the slidable bar 145 which in its reciprocation strikes the edge of the lowermost of the rings 141 and pushes it forward under and in axial alinement with the center of the tube 164. Slidably mounted in the tube 164 is a bar or plunger 168 in whose lower portion is fixed by a screw 169 or otherwise a second rod 170 provided with a concave end face 171 as shown in Fig. 11. The plunger 168 is preferably made in two sections; the upper section 172 being pivotally connected by a pin 173 to the portion 168 of the plunger. The portion 172 of the plunger 168 is fixed to an arm 174 mounted upon the forward end of a lever 175 pivoted intermediate its length upon a pin 177 in the bifurcated end 179 of a post 180 fixed in the top of the table. Mounted in a bifurcated extension 181 upon the outer end of the lever 175 is a cam roll 183 bearing upon the surface of the cam 184, by which the plunger 168 is caused to descend. The lever 175 is held in contact with its cam by a retractile spring 185 attached at one end in a hole 186 in the lever, and at its other end to a pin 188 located on the table. In the table 5 in alinement with the tubular post 164 is an opening or passage 190 over the upper end of which, as has already been described, one of the rings has been located. The disk 96 after conveying the bent planchet to a position below the opening 190, as shown in Fig. 11, is next forced upwardly into the upper position shown in said figure the prongs 17 passing each into one of four adjacent rings.

The mechanism for elevating the planchets into the last described position is as follows: A plunger 192 is slidably mounted in a sleeve 193 integral with or fixed to the bottom face of the table 5 immediately below the opening 190 of the table. In the upper end of the plunger 192 is fixed by a screw 194 or otherwise a small rod 196 which in its reciprocation is adapted to pass upwardly through the opening 100 in the plate 96 and through the opening 190. The lower end of the plunger 192 has a pivoted section 197 pivotally connected with the remainder of the plunger by a pin 198. The section 197 is pivoted to the end of the arm 200, pivoted in turn to a lever 201 mounted at an intermediate portion on a pin 204 fixed in the bifurcated end 205 of a post 206 fixed in the bottom of the table. Upon the end of the lever 201 is a pin 208 movable in a horizontal slot 209 in the end of a lever arm 210 pivoted upon a pin 211 located in the bifurcated end 213 of a downwardly depending bracket 214 fixed by a screw 215 to the rear of the machine. The plunger 192 is depressed by virtue of a retractile spring 218 attached at one end to a pin 219 in the lever 210, and at its other end to a hook 220 in the lower part of the table. Fixed to an intermediate portion of the lever 210 is an arm or extension 222 extending through an opening 223 in the table, and carrying upon its upper extremity a cam roll 224 engaging cam 225 fixed to shaft 8. This cam upwardly forces the plunger 192 in its vertical reciprocation. The rods or tools 170 and 196 are so timed relatively to each other that when the plunger 196 has elevated the planchet 15 to the upper position shown in broken lines in Fig. 11, the plunger 170 descends, and by its concave surface 171 engages the upwardly projecting prongs 17 of the planchet and forces them downwardly and over the rings into the clenched position shown more clearly in Fig. 13.

It is essential that the fabric being formed as described, and which will be represented in a general manner by the reference character 226, must be intermittently advanced or fed to correspond to the intermittent clenching of the parts already described. This is effected as follows: Pivotally mounted at each end of the table extension 13 are cylindrical rollers 230 and 231 adapted to facilitate the movement of a strip of fabric thereover, which fabric is customarily made in an endless sheet. Upon the shaft 8 is a cam 233 provided with a shoulder 234 upon its side face in contact with a roll 235 upon the end of a lever 236 pivoted for horizontal movement intermediate its length by a pin 238 in a block 239 upon the table. Near the outer end of the lever 236 is an oblong slot 241 through which loosely passes a stud or pin 242 extending upwardly from a block 243 provided with an undercut portion 245 sliding in ways 247 in the table extension 13. The block 243 is provided with a transverse passage 249 entering either end of which are pinions or pivot pins 250 semicircular in cross section to which are fixed by screws 252 horizontally extending arms 254 having fixed to their outer extremities by screws 255 or otherwise a transverse plate 256 with a peripheral beveled forward margin 257. At an intermediate portion of the plate 256 is fixed by screws 258 a dog 259 in which is fixed by an adjusting screw 260 a pin 261. This pin extends loosely through an opening 263 in the forward end of the lever 264 pivoted intermediate its length upon a pin 266 in a block 267 upon the top of the table. The rear end of the lever is downwardly curved to form a downwardly inclined point 269 adapted to engage in an oblong peripheral recess 270 upon a cam 271 on the shaft 8. It will be noted that the fabric while being formed is moved step by step in a horizontal direction by the lever 236; that intermittently the plate 256 is forced downwardly between two rows of the fabric, as at 272, Fig. 14, to engage the fabric frictionally pending the horizontal movement of the lever 236; after which an upward vibration of the lever 264 releases the fabric to permit the plate 256 to return again for a new grip. In other words the plate 256 describes a rectangular path in grasping and feeding the material. The plate 256 is advanced by the cam 233, and is returned by the spring 273, which is attached at one end to a pin 274 on the lever 236, and at its other end to a pin 275 on the bearing 7. The lever 264 is held down in contact with the cam 271 by the spring 277 attached at one end to a pin 278 in the bed, and at the other end, in an opening 279 in the lever.

A plate 281 is clamped by screws 282 to a plate 283 on the table 5 between which plates the end of a cylindrical guide rod 285 is frictionally held extending over that portion of the table along which the fabric passes. The rod extends in a direction corresponding with that of the travel of the fabric and terminates at a point beyond the clenching tools. This rod registers in one of the longitudinal channels of the fabric and thereby assists in guiding the latter.

Figure 5:
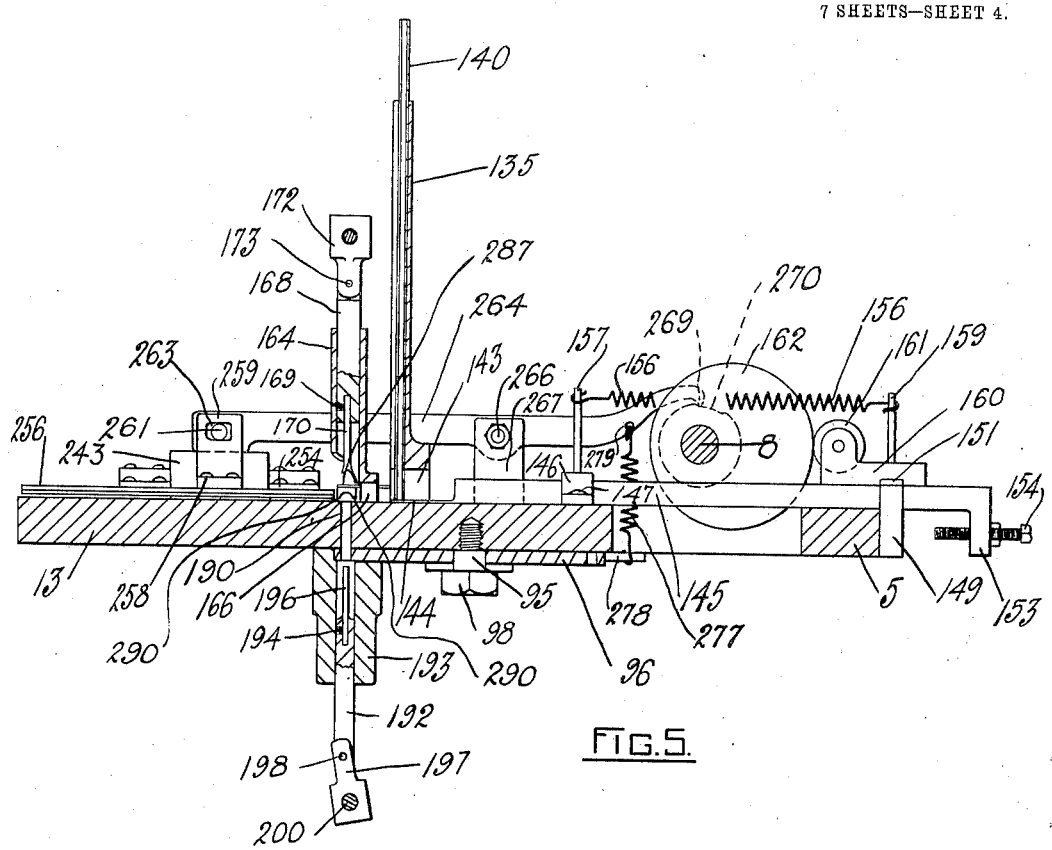

A guide plate 287 is fixed by screws 288 to a block 289 upon the table oppositely disposed to the guide 285 and like the latter extending in a horizontal plane above the table. The end of this plate, as shown in Fig. 10, presses the marginal rings in a horizontal position during the operation of the clenching tools. This plate is provided with interspaced longitudinally disposed ribs or flanges 290 upon its lower face, as shown in Fig. 5, which ribs engage in the channels of the fabric and thus assist in guiding the same.

I claim:—

1. The combination of a support for a coat of mail fabric consisting of a plurality of parallel rows of plates and a plurality of rows of rings disposed both parallel and transversely to said rows and interengaging the plates, clenching tools for interengaging the plates with the rings of said fabric, means for operating said tools, and means for effecting a relative movement of said fabric and said tools to present different portions of said fabric to said tools to receive the plates.

2. The combination of a support for a coat of mail fabric consisting of a plurality of parallel rows of plates and a plurality of rows of rings disposed both parallel and transversely to said rows and interengaging the plates, tools for feeding rings to said fabric, clenching tools for interengaging the plates with the rings of the fabric and with the fed rings, means for operating said tools, and means for effecting a relative movement of said fabric and said tools to present different portions of said fabric to said tools to receive the plates.

3. The combination of a support for a coat of mail fabric consisting of a plurality of parallel rows of plates and a plurality of rows of rings disposed both parallel and transversely to said rows and interengaging said plates, tools for intermittently feeding rings to positions adjacent the rings of the fabric, tools for imparting a preliminary bend to said plates, means for intermittently feeding the bent plates to the rings of the fabric and to the fed rings, and tools for clenching said plates into engagement with the fabric rings and the fed rings.

4. The combination of a support for a coat of mail fabric consisting of a plurality of parallel rows of plates and a plurality of rows of rings disposed both parallel and transversely to said rows and interengaging said plates, tools for intermittently feeding rings to positions adjacent the rings of the fabric, tools for imparting a preliminary bend to said plates, means for intermittently feeding the bent plates to the rings of the fabric and to the fed rings, tools for clenching said plates into engagement with the fabric rings and the fed rings, means for operating the bending tools, means for operating the clenching tools, and means for effecting a relative movement of said fabric and said clenching tools to receive the rings and the plates.

5. The combination of a support for a coat of mail fabric, plate bending devices, plate clenching devices, means for feeding blanks from the bending devices to the clenching devices, means for operating said clenching devices to engage with a plurality of the rings of said fabric, and means for moving said fabric relatively to the clenching devices.

6. The combination of a support for a series of interengaging plates and rings, clenching tools, means for moving said plates and rings relatively to said tools, means for feeding bent plate blanks to said clenching tools, means for operating said clenching tools to automatically assemble the plates and rings and clench the plates to the rings.

7. The combination of a table provided with two openings, a carrier slidably mounted upon the bottom of the table provided with a series of openings adapted to successively register with the first-mentioned openings, a vertically reciprocating plunger upon the table movable in and out of one table opening, a second vertically reciprocating plunger mounted upon the table movable toward and away from the table in alinement with the second table opening, a reciprocating plunger mounted below the table movable in and out of the second opening, and means actuating the carrier for reciprocating the three plungers.

8. The combination of a table provided with two openings, a rotary carrier upon the table provided with an opening adapted to register with the openings in the table when the carrier is rotated, means for intermittently rotating the carrier, a reciprocating plunger on the table movable into and out of one table opening and the opening in the carrier, a second reciprocating plunger on the table movable toward and away from the mouth of the second opening in the table, a third reciprocating plunger movable through the second opening to coöperate with the second plunger, and means actuating the carrier for reciprocating the plungers.

9. The combination of a table provided with an opening, a carrier rotatably mounted below the table provided with an annular series of openings adapted to register with the opening in the table, a tubular post upon the table above said opening, a plunger slidably mounted in the post, a rod slidably mounted upon the table movable toward and away from the plunger, and means actuating the carrier for operating the plunger and the slidable rod.

10. The combination of a support for a coat of mail fabric consisting of series of plates and links interengaging therewith, each plate comprising a body portion and four arm portions folded back upon the body portion, a tool for initially bending the arm portions upwardly, means for feeding rings to the fabric, a tool for inserting the bent arm portions through the fed ring and through three rings of the fabric, a tool coöperating with the last mentioned tool for folding the arm portions back upon the body portion of the plate, and means coöperating with the ring feeding means for actuating all of the tools.

11. The combination of a table provided with an opening, a pin in the bottom of the table, a carrier rotatably mounted in the pin and provided with a plurality of marginal openings adapted to register with the first opening when the carrier is rotated, peripheral teeth upon the carrier, a slide mounted on the table adjacent the carrier, a latch upon the slide engaging said teeth, a tubular post upon the table above said first opening, a plunger slidably mounted in the post, a rod slidably mounted upon the table movable to and from said opening below the plunger, and means actuating the slide for operating the slide and plunger.

12. The combination of a table provided with an opening, a tubular post upon the table above said opening, a plunger slidably mounted in the post, a second hollow post upon the table adjacent the first post, a vertical tube fixed in the second post, a rod slidably mounted on the table extending below the tube and movable toward and away from the plunger, and means actuating the plunger for moving the slide.

13. The combination of a table provided with two openings, posts upon the table over each opening, plungers slidably mounted in the posts, posts upon the table in alinement with the first-mentioned posts, vertical tubes in the second-mentioned posts, rods slidably mounted on the table extending below the tubes and movable toward and from the plungers, a carrier rotatably mounted upon the table in contact with the lower face of the table and provided with a series of openings adapted to register with the first mentioned openings during its rotation, means for rotating the table, and means actuating the rotating means actuating the plungers and rods.

14. The combination of a table, a block slidably mounted on the table, a frame pivotally connected with the block in contact with the table, means for horizontally reciprocating the block, and means for vertically reciprocating the frame at the end of each horizontal reciprocation.

15. The combination of a table, a driving shaft mounted on the table, two cams on the shaft, a block slidably mounted on the table, a horizontally movable lever pivotally supported by the table engaging the slide and one cam, a frame pivotally connected with the block in contact with the table, and a vertically movable lever pivotally supported on the table engaging the frame and the other cam.

16. The combination of a table, a block slidably mounted on the table provided with a transverse passage, pivot pins loose in the passage, arms fixed to the pins, a transversely disposed plate fixed to the arms provided with a beveled margin, a pin in the block, a pin in the plate, a horizontally movable lever mounted upon the table engaging the first pin, a vertically movable lever engaging the second pin, a driving shaft mounted upon the table, and cams on the shaft engaging the ends of the levers.

17. The combination of a support for a coat of mail fabric consisting of a plurality of rows of plates and rows of rings disposed both parallel and transversely to said rows and interengaging the plates, clenching tools for interengaging the plates with the rings of said fabric, means for operating said tools, and vibrating means for effecting a movement of said fabric relatively to the tools to present different portions of the fabric to said tools to receive the plates.

18. The combination of a table for supporting a coat of mail fabric, clenching tools mounted on the table for engaging the constituent plates to the fabric being formed, a horizontally movable slide mounted upon the table adjacent the tools, a vertically movable frame pivotally connected at one end with the slide and having its free end resting upon the fabric upon the table adjacent the tools, means for reciprocating the slide, and means for elevating the frame at the end of each reciprocation of the slide.

19. The combination of a table, two anti-friction rollers disposed parallel with each other but transversely of the table mounted in the table at a distance from each other, a block slidably mounted on the table and movable transversely of the rollers, a frame pivotally connected with the block at one end and having its other end resting upon the table, means for horizontally reciprocating the block, and means for vertically vibrating the frame.

20. The combination of a table for supporting a coat of mail fabric, clenching tools mounted on the table for engaging the constituent plates to the fabric being formed, a reciprocating member mounted on the table adjacent the tools adapted to intermittently advance the fabric along the table to the tools, means for reciprocating said member, and a guide rod mounted on the table and disposed in the direction of travel of said member and adapted to engage the face of the fabric.

21. The combination of a table for supporting a coat of mail fabric, tools mounted on the table for engaging the constituent plates to the fabric being formed, a reciprocating member mounted on the table adjacent the tools adapted to intermittently advance the fabric along the table to the tools, means for reciprocating said member, and a guide plate mounted upon the table and disposed in the direction of the travel of said member and extending in a horizontal plane above the table and adjacent the tools.

22. The combination of a table for supporting a coat of mail fabric, tools mounted on the table for engaging the constituent plates to the fabric being formed, a reciprocating member mounted on the table adjacent the tools adapted to intermittently advance the fabric along the table to the tools, means for reciprocating said member, a guide plate mounted upon the table disposed in the direction of travel of said member and extending in a horizontal plane above the table, and longitudinal ribs upon the bottom of the plate adapted to engage the face of the fabric.

In testimony whereof I have affixed my signature in presence of two witnesses.

GEORGE GROS.

Witnesses:
 HORATIO E. BELLOWS,
 EDW. H. ZIEGLER.